Patented Jan. 3, 1933

1,892,769

UNITED STATES PATENT OFFICE

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE

PLASTIC OR COATING COMPOSITIONS

No Drawing. Original application filed May 29, 1928, Serial No. 281,593. Divided and this application filed April 4, 1929. Serial No. 352,610.

This invention relates to compositions containing cumarone and indene resins for use as plastics or for preparing coats or films. More particularly the invention relates to plasticizers, softeners, and the like for such products.

In the past it has been necessary to add plastisizers to various plastic, coating and compositions containing cumarone and indene resins. Many of these products have been unsatisfactory because in the case of some plastic compositions the resultant product is brittle or lacks flexibility or machining qualities and in the case of coating compositions which are dissolved in solvents the complete evaporation of the solvents leaves films which are brittle and tend to crack or peel. A class of compounds called softeners have been used to obviate this, among the most important softeners being high boiling esters, such as those of phthalic acid, certain high boiling organic compounds, such as various aromatic sulphonamides, and the like. Some of these products are very satisfactory but many have not achieved great commercial success because of excessive costs.

The present invention relates to plastic compositions and compositions for forming coatings in which a new class of compounds are used as softeners, namely, the reduction products of phthalic anhydride, the phthalides. Phthalide is a soft solid melting at 83° C. and boiling at 290° C. It is substantially inert, soluble in most of the solvents used and can be readily incorporated with plastic compositions or coating compositions. It does not evaporate, withstands the temperatures necessary for molding and endows the final product with the desired plasticity and workability. Where somewhat more fluid compounds are required the various hydrogenated phthalides, such as the tetra- and particularly the hexahydrophthalides may be used. Thus hexahydrophthalide is a colorless, odorless, heavy oil having a boiling point of 134–138° C. at 25 m. m. pressure and can be used with excellent effect in many plastic compositions and particularly coating compositions, such as, for example glycerol phthalate lacquers, and the like.

Hydrogenated phthalides may be produced by catalytic vapor phase hydrogenation of phthalic anhydride in the presence of suitable catalysts or liquid phase hydrogenation of phthalic anhydride at ordinary or superatmospheric pressure, and it is sometimes desirable to produce mixtures of phthalides and their hydrogenated products or mixtures of the various hydrogenated products in order to produce plasticizers having intermediate characteristics between those of phthalides and hexahydrophthalide. Such mixtures either produced directly by catalysis or prepared by blending the pure ingredients are included in the present invention under the expression "phthalide substance". The phthalides which are internal esters of orthooxymethylbenzoic acid or its derivatives vary in their physical properties depending on the degree of hydrogenation but they all possess the desirable softening properties, are non-corrosive, relatively non-volatile and satisfactorily withstand the temperatures required in molding plastics.

Another important class of phthalide substances are the alkyl, alkylidene, and aryl substituted phthalides. Thus for example, one or both hydrogen atoms attached to the oxymethyl carbon may be substituted for alkyl or aryl phthalides and both hydrogen atoms can be substituted to form alkylidene phthalides; the general formulae are as follows:

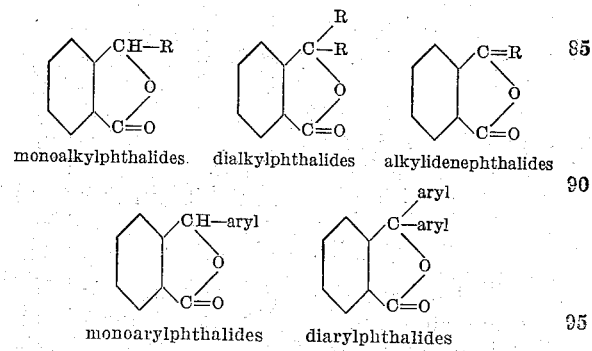

monoalkylphthalides. dialkylphthalides. alkylidenephthalides monoarylphthalides diarylphthalides The substituted di-, tetra- and hexahydrophthalides are also usable, and constitute effective plasticizers. A few substituted phthalides are the monoethyl- propyl- butyl- and isobutylphthalides, and hydrogenated phthalides possessing in general these products are low melting solids or oils with a pleasant celery odor. It is obviously impossible to definitely determine just what takes place in a plastic composition which forms an infusible, insoluble end product. Examples of dialkylphthalides and hydrogenated phthalides are the diethyl, dipropyl, dibutyl and diisobutylphthalides and hydrogenated phthalides. Arylphthalides such as phenylphthalides or diphenylphthalides are also very important, especially where extremely high boiling, normally solid plasticizers are desired, as in the case of some molding compositions.

The whole group of phthalide substances is characterized by softness and plasticity, relatively low vapor pressure and desirable resistance to high temperatures. Many of the products are colorless solids or oils, either odorless or possessing an agreeable odor, such as the monoalkylphthalides; some are colored, being yellow, yellow brown or red brown oils or solids. All of the members are non-corrosive and do not evolve poisonous vapors, and possess very advantageous properties for use as plasticizers.

It should be understood that the effect of the phthalides as plasticizers is primarily physical. There is every reason to believe from their behavior that usually no chemical compounds are formed between the phthalides and the plastic compositions in which they are used although of course this cannot be determined with complete accuracy in every case as the final products obtained for molding compositions are not of a character which permit of ready chemical analysis.

The following examples will illustrate the application of the invention to a few of the immense number of plastic compositions and coating compositions which are of importance in industry today. It is understood that the invention is not limited to the details set forth in these specific examples which are merely illustrations of a few typical embodiments.

*Example 1*

A polymerized cumarone and indene resin is melted and mixed with about 12% of a mixture of 90% phthalide and 10% of hexahydrophthalide. The mixture should be stirred to thoroughly incorporate the plasticizer and if desired fillers may be added. The composition is then molded in the usual manner.

*Example 2*

A varnish or lacquer is prepared by dissolving cumarone and indene resins in the usual low boiling solvents and 10-15% of hexahydrophthalide or hexahydromonoethyl is added. The lacquer spreads and brushes easily forming a very flexible, tough film.

It should be understood that the expression "phthalide substance" is intended to cover phthalide itself, together with its various hydrogenated products, such as tetra- and hexahydrophthalide and their alkyl, alkylidene, alicyclyl and aryl derivatives.

This application is a division of my prior application, Serial No. 281,593, filed May 29, 1928.

What is claimed as new is:

1. A plasticized composition comprising a cumarone and indene resin and a hydrogenated phthalide substance having the formula

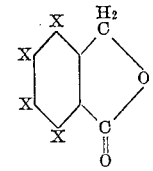

in which X is H or $H_2$, at least one X being $H_2$.

2. A coating composition comprising a cumarone and indene resin, at least one volatile solvent therefor and at least one substituted phthalide substance having the formula

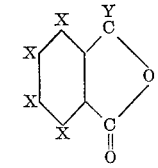

in which X is H or $H_2$ and Y is H-alkyl, dialkyl, H-aryl, diaryl or alkylidine.

3. A coating composition comprising a cumarone and indene resin, at least one volatile solvent therefor and at least one hydrogenated phthalide substance having the formula

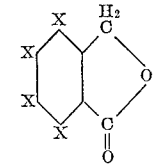

in which X is H or $H_2$, at least one X being $H_2$.

4. A coating composition comprising a cumarone and indene resin, at least one volatile solvent therefor and at least one hexahydrophthalide having the formula

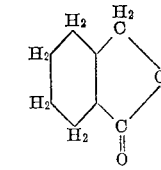

Signed at Pittsburgh, Pennsylvania, this 1st day of April, 1929.

ALPHONS O. JAEGER.